United States Patent [19]

Winslow et al.

[11] Patent Number: 4,820,790
[45] Date of Patent: Apr. 11, 1989

[54] CHAIN-EXTENDED POLY(ARYL ETHER KETONES)

[75] Inventors: Paul A. Winslow, Millington; Markus Matzner, Edison, both of N.J.

[73] Assignee: Amoco Corporation, Chicago, Ill.

[21] Appl. No.: 25,367

[22] Filed: Mar. 13, 1987

[51] Int. Cl.$^4$ .................. C08G 8/02; C08G 14/00
[52] U.S. Cl. .................................. 528/125; 528/126; 528/128; 528/219
[58] Field of Search ............... 528/125, 126, 128, 219

[56] References Cited

U.S. PATENT DOCUMENTS 4,320,224 3/1982 Rose et al. .................... 528/125

FOREIGN PATENT DOCUMENTS 2393835 1/1979 France .

Primary Examiner—John Kight
Assistant Examiner—M. L. Moore
Attorney, Agent, or Firm—Donald M. Papuga; William H. Magidson; Ralph C. Medhurst

[57] ABSTRACT

Described herein are novel crystalline chain-extended polymers containing segments of crystalline poly(aryl ether ketones). These poly(aryl ether ketones) are easy to prepare and display excellent toughness, fabricability, and very good high temperature and solvent resistance.

5 Claims, No Drawings

CHAIN-EXTENDED POLY(ARYL ETHER KETONES)

FIELD OF THE INVENTION

This invention is directed to novel crystalline chain extended polymers containing segments of crystalline poly(aryl ether ketones). The poly(aryl ether ketones) are easy to prepare the display excellent toughness, fabricability, and very good high temperature and solvent resistance.

BACKGROUND OF THE INVENTION

Over the years, there has been developed a substantial body of patent and other literature directed to the formation and properties of poly(aryl ethers) (hereinafter called "PAE's"). Some of the earliest work such as by Bonner, U.S. Pat. No. 3,065,205, involves the electrophilic aromatic substitution (e.g., Friedel-Crafts catalyzed) reaction of aromatic diacylhalides with unsubstituted aromatic compounds such as diphenyl ether. The evolution of this class to a much broader range of PAE's was achieved by Johnson et al., Journal of Polymer Science, A-1, Vol. 5, 1967, pp. 2415-2427; Johnson et al., U.S. Pat. Nos. 4,108,837 and 4,175,175. Johnson et al. show that a very broad range of PAE's can be formed by the nucleophilic aromatic substitution (condensation) reaction of an activated aromatic dihalide and an aromatic diol. By this method, Johnson et al. created a host of new PAE's including a broad class of poly(aryl ether ketones), hereinafter called "PAEK's".

In recent years, there has developed a growing interest in PAEK's as evidenced by Dahl, U.S. Pat. No. 3,953,400; Dahl et al., U.S. Pat. No. 3,956,240; Dahl, U.S. Pat. No. 4,247,682; Rose et al., U.S. Pat. No. 4,320,224; Maresca, U.S. Pat. No. 4,339,568; Atwood et al., Polymer, 1981, Vol. 22, August, pp. 1096-1103; Blundell et al., Polymer, 1983, Vol. 24, August, pp. 953-958; Atwood et al., Polymer Preprints, 20, No. 1, April 1979, pp. 191-194; and Rueda et al., Polymer Communications, 1983, Vol. 24, September, pp. 258-260. In early to mid 1970, Raychem Corporation commercially introduced a PAEK called STILAN®, a polymer whose acronym is PEK, each ether and keto group being separated by 1,4-phenylene units. In 1978, Imperial Chemical Industries PLC (ICI), commercialized a PAEK under the trademark Victrex PEEK. As PAEK is the acronym of poly(aryl ether ketone), PEEK is the acronym of poly(ether ether ketone) in which the 1,4-phenylene units in the structure are assumed.

Thus, PAEK's are well known; they can be synthesized from a variety of starting materials; and they can be made with different melting temperatures and molecular weights. The PAEK's are crystalline, and as shown by the Dahl and Dahl et al. patents, supra, at sufficiently high molecular weights they can be tough, i.e., they exhibit high values ($>50$ ft-lbs/in$^2$) in the tensile impact test (ASTM D-1822). They have potential for a wide variety of uses, but because of the significant cost to manufacture them, they are expensive polymers. Their favorable properties class them in the upper bracket of engineering polymers.

PAEK's may be produced by the Friedel-Crafts' catalyzed reaction of aromatic diacylhalides with unsubstituted aromatic compounds such as diphenyl ether as described in, for example, U.S. Pat. No. 3,065,205. These processes are generally inexpensive processes; however, the polymers produced by these processes have been stated by Dahl et al., supra, to be brittle and thermally unstable. The Dahl patents, supra, allegedly depict more expensive processes for making superior PAEK's by Friedel-Crafts catalysis. In contrast, PAEK's such as PEEK made by nucleophilic aromatic substitution reactions, generally display good toughness and acceptable mechanical properties.

THE INVENTION

The present invention is directed to chain extended poly(aryl ether ketone) polymers. The preparation of the starting poly(aryl ether ketone) segments can be performed by using both nucleophilic and electrophilic polycondensation reactions. Subsequent coupling of the oligomers to the desired high molecular weight products is conducted via the nucleophilic route, i.e., using a base and an aprotic solvent. Products having superior toughness, good fabricability, and excellent solvent and temperature resistance are obtained.

The poly(aryl ether ketones) of this invention are high molecular weight, linear polymers displaying an excellent combination of properties. The preparation of high molecular weight poly(aryl ether ketones) is described in the literature. Quite often, however, the observed high molecular weights are the consequence of branching the partial crosslinking which accompany the polycondensation. As a result, in spite of the apparent high molecular weight, the products display poor strength and poor mechanical behavior. The two-step process of the instant invention avoids the undesirable side-reactions of branching and crosslinking and leads to high quality materials.

The polymers of the present invention are obtained via a two-step process which comprises the steps of:

(a) The preparation of a poly(aryl ether ketone) oligomer or precursor, followed by (b) The coupling (or chain-extension) of the precursor to a high molecular weight material.

A. The preparation of the poly(aryl ether ketone) precursor

As indicated above, both nucleophilic and electrophilic processes can be used for the preparation of the precursor.

A.1 The nucleophilic route

Reaction of an excess of 4,4'-dihydroxybenzophenone with 4,4'-difluorobenzophenone yields a hydroxy-terminated poly(aryl ether ketone) segment - Equation (I):

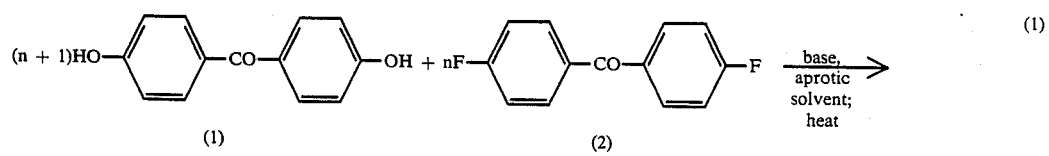

(1)

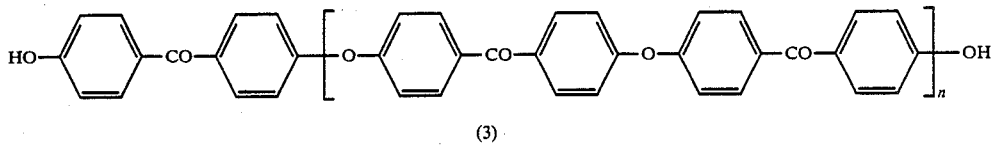

(3)

The intermediate (3) may be prepared at any desired molecular weight. The higher the excess of 4,4'-dihydroxybenzophenone, the lower the molecular weight of the resulting precursor (3).

Dihalo-terminated precursors can be prepared via a similar route, except that an excess of 4,4'-difluorobenzophenone is used - Equation (II):

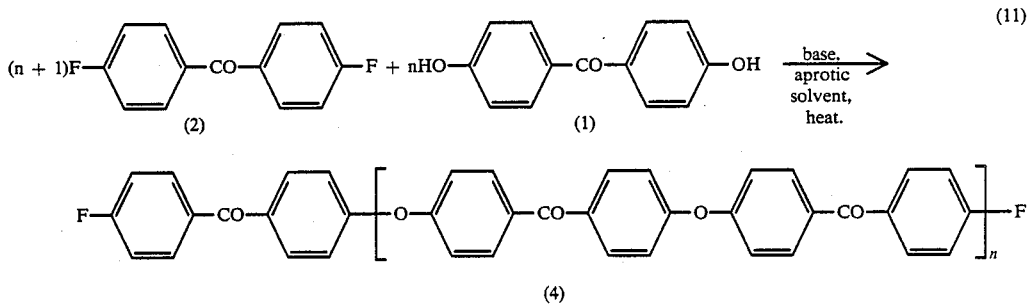

The molecular weight of (4) is easily controlled by controlling the excess of the dihalo-component (2).

A.2 The electrophilic route

The oligomer is prepared by the self-condensation of the acid or acid halide (5) wherein Y

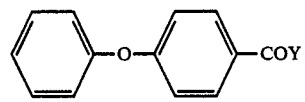

(5)

denotes a hydroxyl group or a halogen, preferably chlorine, in the presence of a Friedel-Crafts catalyst and, optionally, in a solvent. The polycondensation of (5) is carried out in the presence of small amounts of a haloaromatic acid or acid halide and an aromatic hydrocarbon containing an ester or a halide group. The preparation of the oligomer is illustrated in Equation (III):

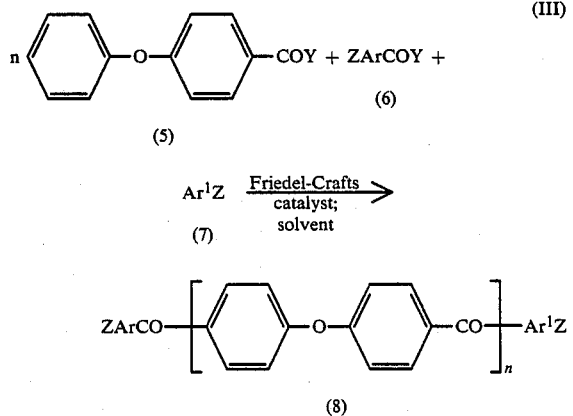

In the above equation, Z is halogen, preferably fluorine or chlorine, or an ester group OR, wherein R is an acyl group of the formula —COR', in which R' is a lower alkyl, preferably methyl or ethyl. Ar is a divalent aromatic group; Ar' is a monovalent aromatic group. In cases where chain-extension of the dihalo-terminated precursor (8) is contemplated, the endgroups ZAr- and ZAr'- contain a carbonyl or another electronwithdrawing function such as the $SO_2$ group in the position ortho or para to Z. This is not a requirement when the corresponding dihydroxy-terminated oligomers [of Equation (VI)]are being coupled.

The preferred ZArCOY include (9), (10), (11), and (12), or the corresponding acids.

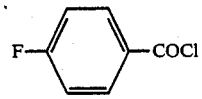

(9)

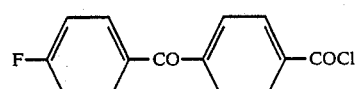

(10)

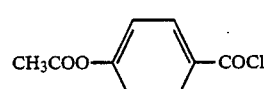

(11)

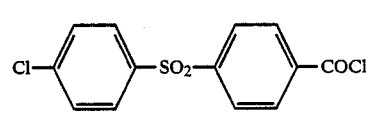

(12)

The preferred compounds corresponding to the formula Ar'Z include:

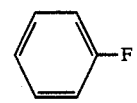

(13)

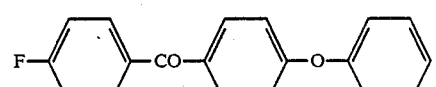

(14)

(15) 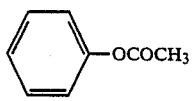
(16) 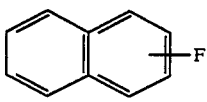
(17) 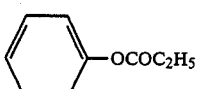
(18) 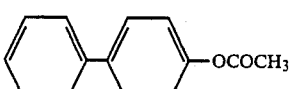
(19) 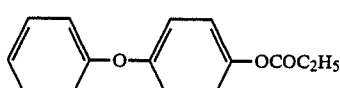
(20) 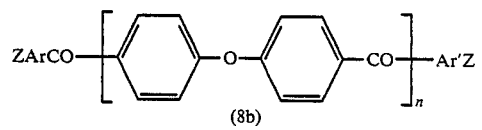
In another preferred embodiment, the oligomers of the instant invention can be prepared by the reaction shown in Equation (IV).
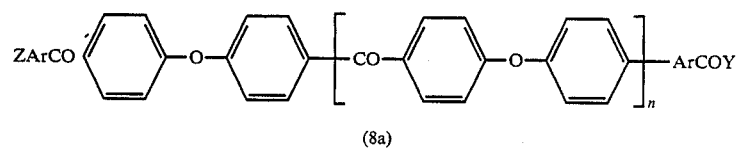
where Z, Ar, Y, and Ar' are as defined above.
It is, of course, also possible to react an excess of either (21) or (22),
(IVa)
(8a)
or
(IVb)
(8b)
In still another preferred embodiment, the oligomers useful in the instant invention are prepared by the sequence shown:

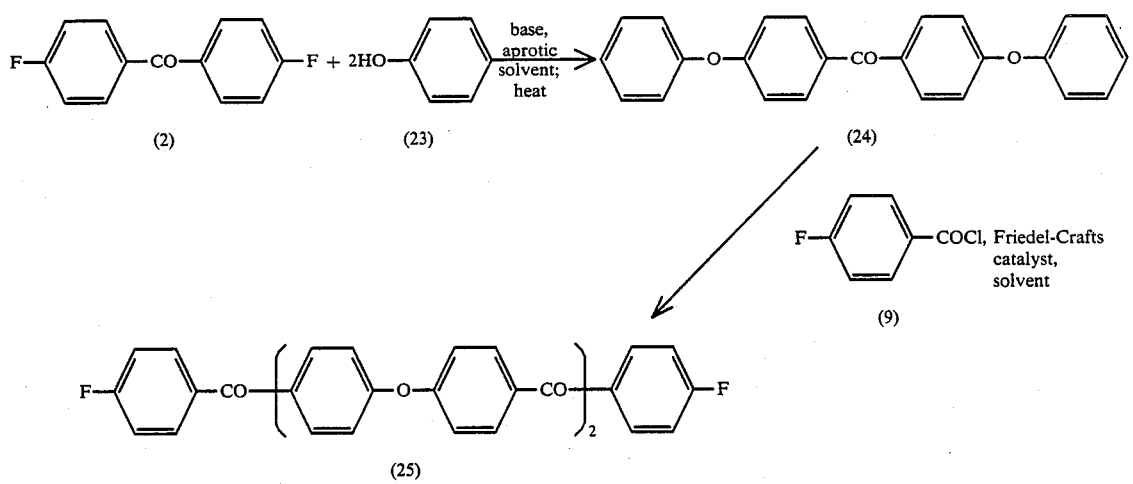

The reactions of Equation (V) can also be applied to higher homologs of (2). The scheme represents a novel, unambiguous synthesis of oligomers

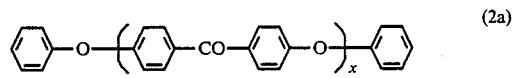

and of difluoro-terminated poly(aryl either ketone) oligomers of the general formula (2b). Hydrolysis of the latter [cf. Equation (VI)]leads to the corresponding dihydroxy precursors. The starting, 4,4'-difluorobenzophenone (2) is the first member (x=0) of the series (2b):

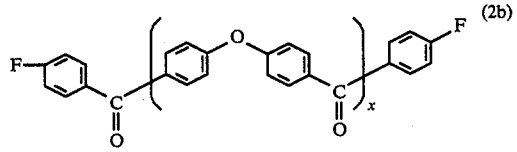

The derivatives (2b), wherein x=1 is obtained by the Friedel-Crafts reaction of p-fluorobenzoic acid chloride with diphenyl ether, which is the first member (x=0) of the (2a) series. Compound (24) is the next member (x=1) of the (2a) series.

The general scheme is thus:

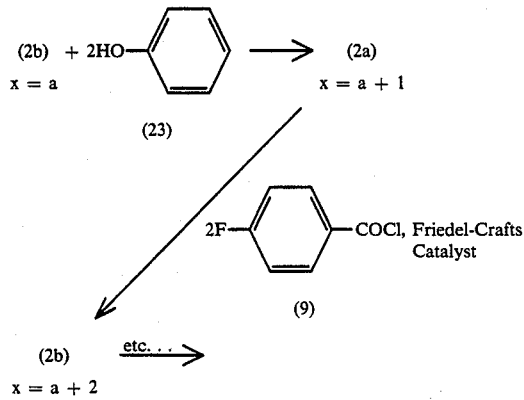

The three reactants (5), (6), and (7) [Equation (III)]or the three or the four reactants (21), (22), (6), and (7) [Equations (IV), (IVa) and (IVb)]may be reacted simultaneously. In some instances, however, it may be advantageous to add the reagents in a consecutive manner. Thus, it is, for example, possible to first prereact (5) and (6) and then add (7). The possible premutations and combinations are obvious to those skilled in the art.

When the end-groups Z are both halogens, the reactions depicted in Equations (III) and (IV) yield directly the desired dihalo-terminated precursor. Hydrolysis in the presence of aqueous base gives the corresponding dihydroxy-terminated oligomer. Reactions (III) and (IV) yield a halo-ester or a diester when one or both Z functions are an ester group. Again, hydrolysis leads quantitatively to the oligomeric diol [Equation (VI)].

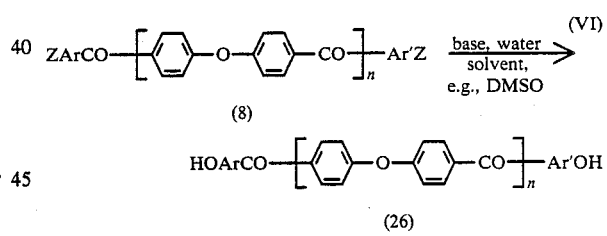

It is to be noted that the molecular weight of (8) is controlled using known techniques. Thus, the amount of (6) and (7) relative to (5) is one determining factor. Also, the preparation of (8) may, for instance, be conducted in an solvent where precipitation takes place after a given molecular weight is reached. Many other methods exist and are well known to those skilled in the art.

The molecular weight of the precursors, i.e., (3), (4), (8), (26), etc. can vary from as low as a trimer (i.e., containing three repeat units

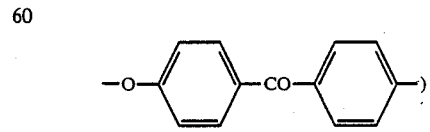

to as high as about 10,000.

The nucleophilic preparation of the precursors of the instant invention is preformed using the techniques described below for the coupling of oligomers to high polymers.

The electrophilic synthesis can, for example, be performed in the presence of hydrogen fluoride-boron trifluoride catalysts as described in U.S. Pat. Nos. 3,953,400; 3,441,538; 3,442,857; and 3,516,966.

Additionally, the precursors may be prepared by Friedel-Crafts' processes as described in, for example, U.S. Pat. Nos. 3,065,205; 3,419,462; 3,441,538; 3,442,857; 3,516,966; and 3,666,612. In these patents a PAEK is produced by Friedel-Crafts polymerization techniques using Friedel-Crafts catalysts such as aluminum trichloride, zinc chloride, ferric bromide, antimony pentachloride, titanium tetrachloride, etc. and a solvent. The reactions may be conducted in the presence of small amounts of added Lewis base such as lithium chloride, N,N-dimethylformamide, and hydrogen chloride, as described in, for example, World Patent Application WO 84/03891 and Australian Patent Application 85/40541.

The precursor may also be prepared according to the processes as described in, for example, U.S. Defensive Publication T-103,703 and U.S. Pat. No. 4,396,755. In such processes, reactants such as an aromatic monocarboxylic acid, are polycondensed in the presence of a fluoroalkane sulphonic acid, particularly trifluoromethane sulphonic acid.

Additionally, the PAEK precursors of the instant invention may also be prepared according to the process as described in U.S. Pat. No. 4,398,020. In such a process, aromatic monoacyl halides of the formula H—Ar''—COY where —Ar''— is a divalent aromatic radical such as diphenyl ether diyl, and H is an aromatically bound hydrogen atom, Y is halogen, preferably chlorine, and COY is an aromatically bound acyl halide group, which monoacyl halide is self-polymerizable, are reacted to the oligomer stage in the presence of a fluoroalkane sulphonic acid.

The polymerization is generally carried out in the presence of a solvent. The preferred organic solvent is 1,2-dichloroethane. Other solvents such as symmetrical tetrachloroethane, o-dichlorobenzene, hydrogen fluoride, or carbon disulfide may be employed.

The reaction may be carried out over a range of temperatures which are from about $-40°$ C. to about $160°$ C. In general, it is preferred to carry out the reaction at a temperature in the range of $0°$ to about $30°$ C. In some cases, it is advantageous to carry out the reaction at temperatures above $30°$ C. or below $0°$ C. The reaction may be carried out at atmospheric pressure although higher or lower pressures may be used.

B. Chain-extension of the precursor to a high molecular weight material

The dihydroxyl-terminated precsursors (3) or (26) are extended to the desired high molecular weight poly(aryl ether ketones) (28) and (29) by condensation with an activated dihaloaromatic compound, viz.

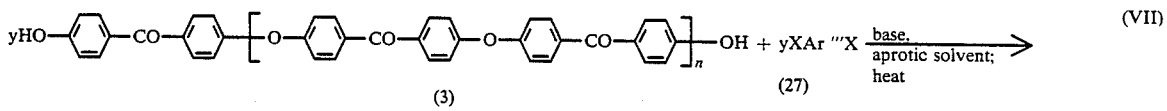

(3)    (27)    (VII)

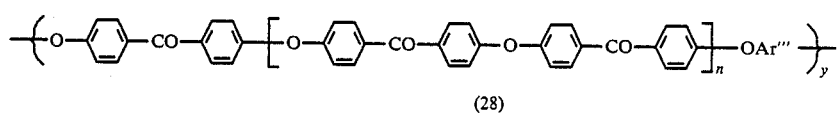

(28)

or

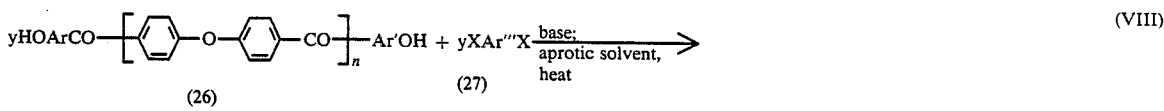

(26)    (27)    (VIII)

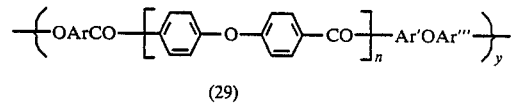

(29)

In the formulae above, X denotes a halogen such as chlorine, fluorine, bromine or a nitro group; Ar''' is a divalent aromatic residue containing electron-withdrawing groups in positions ortho and/or para to the halogen or nitro functions, with the proviso that Ar''' cannot be the residue of 4,4'-dihalobenzophenone.

It is to be noted that the hydroxyl-terminated intermediates (3) or (26) may first be isolated and then reacted with the activated dihalo coupling agent; it is also possible to conduct the sequence of steps in a one-pot operation in which the preparation of the precursor is followed directly by its coupling to the final copolymer (28) or (29). Obviously, mixtures of two or more coupling agents of the formula (27) can also be used in the process of the instant invention.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho and para to the halogen or nitro group. The dihalobenzenoid or dinitrobenzenoid compound can be either mononuclear where the halogens or nitro groups are attached to the same benzenoid ring or polynuclear where they are attached to different benzenoid rings, as long as there is an activating electron withdrawing group in the ortho or para position of that benzenoid nucleus. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about 1 percent and preferably below 0.5 percent for best results.

An electron-withdrawing group is employed as the activator group in these compounds. It should be, of course, inert under the reaction conditions, but otherwise its structure is not critical. Preferred are the strong activating groups such as the sulfone

group bonding two halogen or nitro substituted benzenoid nuclei as in 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same bezenoid nucleus as the halogen or nitro group; however, the presence of other groups on the nucleus or in the residuum of the compound can be tolerated. Preferably, all of the substituents on the benzenoid nucleus are either hydrogen (zero electron-withdrawing), or other groups having a positive sigma value, as set forth in J. F. Bunnett in Chem. Rev. 49, 273 (1951) and Quart. Rev., 12, 1 (1958). See also Taft, *Steric Effects in Organic Chemistry*, John Wiley & Sons (1956), Chapter 13; Chem. Rev., 53, 222; JACS, 74, 3120; and JACS, 75, 4231.

The activating group can be basically either of two types:

(a) monovalent groups that activate one or more halogens or nitro groups on the same ring such as another nitro or halo group, phenylsulfone, or alkylsulfone, cyano, trifluoromethyl, nitroso, and hetero nitrogen, as in pyridine.

(b) divalent groups which can activate displacement of halogens or nitro groups on two different rings, such as the sulfone group

the carbonyl group

the vinylene group

the sulfoxide group

the azo group —N=N—; the saturated fluorocarbon group —CF$_2$CF$_2$—; the organic phosphine oxides

where R$_2$ is a hydrocarbon group; and the ethylidene group

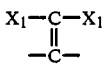

where X$_1$ can be hydrogen or halogen, and activating groups within the nucleus which can activate halogens or nitro functions on the same or adjacent ring such as in the case with difluorobenzoquinone, 1,4- or 1,5- or 1,8-difluoroanthraquinone, etc.

The preferred coupling agents are represented by the formulae (30), (31), (32), and (33).

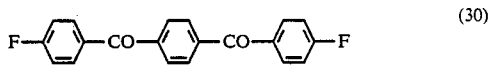
(30)

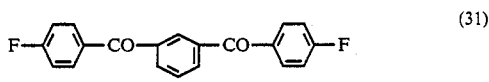
(31)

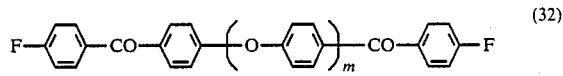
(32)

where m is 1 to 5

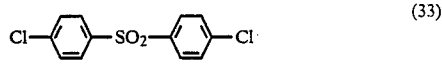
(33)

The most preferred coupling agents are selected from the group of the difluoro-compounds (30), (31), and (33).

In an alternative embodiment, the chain-extended polymers of the instant invention are obtained by coupling the dihaloterminated precursors (4) or (8) with a diphenol or a mixture of diphenols as shown in Equations (IX) and (X). The coupling reaction can be effected either after isolation and purification of the precursors or using the latter directly as prepared, e.g., in a one-pot operation.

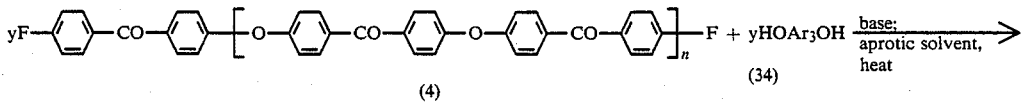
(IX)

$$-\left\{-\left(\underset{}{\bigcirc}\right)-CO-\left(\underset{}{\bigcirc}\right)-\left[O-\left(\underset{}{\bigcirc}\right)-CO-\left(\underset{}{\bigcirc}\right)-O-\left(\underset{}{\bigcirc}\right)-CO-\left(\underset{}{\bigcirc}\right)\right]_n-OAr_3O-\right\}_y$$

(35)

$$yZArCO-\left[-\left(\underset{}{\bigcirc}\right)-O-\left(\underset{}{\bigcirc}\right)-CO-\right]_n-Ar'Z + yHOAr_3OH \xrightarrow[\text{aprotic solvent,}]{\text{base;}} \quad (X)$$

(8)        (34)         heat both Z functions are a halogen $$-\left\{-ArCO-\left[-\left(\underset{}{\bigcirc}\right)-O-\left(\underset{}{\bigcirc}\right)-CO-\right]_n-Ar'-O-Ar_3O-\right\}_y$$

(36)

In the formulae above, $Ar_3$ is the residuum of a diphenol different from 4,4'-dihydroxybenzophenone. The diphenol can be, for example, a dihydroxydiphenyl alkane or the nuclear halogenated derivative thereof, such as, for example, 2,2-bis(4-hydroxyphenyl)propane, 1,1-bis(4-hydroxyphenyl)2-phenyl ethane, bis(4-hydroxyphenyl)methane, or their chlorinated derivatives containing one or two chlorines on each aromatic ring. Other materials also termed appropriately "bisphenols" re also highly valuable and preferred. These materials are the bisphenols of a symmetrical or unsymmetrical joining group, the latter, for example, being an ether oxygen (-0-), carbonyl $$\underset{\parallel}{\overset{O}{(-C-)}},$$

sulfone $$\underset{\underset{O}{\overset{\parallel}{(-S-)}}}{\overset{O}{\parallel}},$$

or hydrocarbon residue in which the two phenolic nuclei are joined to the same or different carbon atoms of the residue.

Such dinuclear phenols can be characterized as having the structure:

$$\underset{HO(Ar_4-R_1-Ar_4)OH}{\overset{(A_1)_a \quad (A_2)_b}{|}}$$

wherein $Ar_4$ is an aromatic group and preferably is a phenylene group, $A_1$ and $A_2$ can be the same or different inert substituent groups such as alkyl groups having from 1 to 4 carbon atoms, halogen atoms, i.e., fluorine, chlorine, bromine, or iodine, or alkoxy radicals having from 1 to 4 carbon atoms, a and b are integers having a value of from 0 to 4, inclusive, and $R_1$ is representative of a bond between aromatic carbon atoms as in a dihydroxy-diphenyl, such as 4,4', 3,3', or 4,3'-dihydroxydiphenyl; or is a divalent radical, including, for example, radicals such as $$\underset{\parallel}{\overset{O}{-C-}},$$

—O—, —S—, —SO—, —S—S—, —SO₂, and divalent hydrocarbon radicals such as alkylene, alkylidene, cycloalkylene, cycloalkylidene, or the halogen, alkyl, aryl or like substituted alkylene, alkylidene or cycloaliphatic radicals or an aromatic radical; it may also represent rings fused to both $Ar_4$ groups.

Examples of specific dihydric polynuclear phenols include, among others, the bis-(hydroxyphenyl) alkanes such as
2,2-bis-(4-hydroxyphenyl)propane,
2,4'-dihydroxydiphenylmethane,
bis-(2-hydroxyphenyl)methane,
bis-(4-hydroxyphenyl)methane,
bis-(4-hydroxy-2,6-dimethyl-3-methoxyphenyl)methane,
1,1-bis-4-hydroxyphenyl)ethane,
1,2-bis-(4-hydroxyphenyl)ethane,
1,1-bis-(4-hyroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane,
2,2-bis-(2-isopropyl-4-hydroxyphenyl)propane,
2,2-bis-(4-hydroxy-1-naphthyl)propane,
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenyl-propane,
2,2-bis-(4-hydroxyphenyl)-1,1,1,3,3,3,-hexfluoropropane, and the like;
di(hydroxyphenyl) sulfones such as
bis-(4-hydroxyphenyl)sulfone,
2,4'-dihydroxydiphenyl sulfone,
5-chloro-2,4'-dihydroxydiphenyl sulfone,
5-chloro-4,4'-dihydroxydiphenyl sulfone, and the like.
di(hydroxyphenyl)ethers such as
bis-(4-hydroxyphenyl)ether,
the 4,3'-, 4,2'-, 2,2'-, 2,3'-, dihydroxydiphenyl ethers
4,4'-dihydroxy-2,6-dimethyldiphenyl ether,bis-(4-hydroxy-3-isobutylphenyl)ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxy-1-naphthyl)ether,
bis-(4-hydroxy-3-chloro-1-naphthyl)ether, and
4,4'-dihydroxy-3,6-dimethoxydiphenyl ether.
di(hydroxydiphenyl)ketones such as the
4,3'-,4,4'-,4,2'-,2,2'-, 2,3'-dihydroxy-benzophenones,
dihydroxy-diketones such as
1,4-bis(4'-hydroxybenzoyl)benzene,
4,4'-bis(4''-hydroxybenzoyl)diphenyl ether, 1,3-bis(4'-hydroxybenzoyl)benzene;

mononuclear diphenols such as resorcinol and hydroquinone; fused ring polynuclear diphenols such as dihydroxynaphthalenes, dihydroxyanthracenes, and dihydroxyphenanthrenes.

The preferred diphenolic coupling agents correspond to the formulae shown:

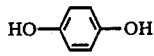 (37)

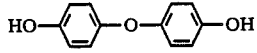 (38)

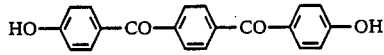 (39)

 (40)

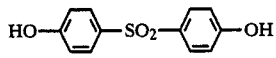 (41)

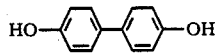 (42)

Compounds (37), (38), (39), and (42) are the most preferred for the purposes of the present invention.

European Patent Application 125,816, filed April 19, 1984, based for priority upon British Patent Application 83-13,110, filed May 12, 1983, is directed to a method for increasing the molecular weight by melt polymerization of a poly(aryl ether) such as PEEK.

The process of European Patent Application 125,816, provides a basis by melt polymerization above the crystalline melting point of the poly(aryl ether) to increase the molecular weight by chain-extension of polymer blocks. The application theorizes that the procedure can be used for making the block copolymers described in U.S. Pat. Nos. 4,052,365 and 4,268,635. Implicit problems associated in the process of this application are the difficulty in controlling the molecular weight of the resulting polymer and/or limiting isomerization and the problems associated with branching. The process of this European application would appear to be advantageous in making compositions where the linearity and solution properties of the final polymer are not so critical.

In contrast, the nucleophilic polycondensation reactions of the instant invention are carried out in solution by heating a mixture of the said monomers or precursors with the appropriate monomers at a temperature of from abou 100° to about 400° C. The reactions are conducted in the presence of an alali metal carbonate or bicarbonate. Preferably a mixture of alkalimetal carbonates or bicarbonates is used. When a mixture of alkali metal carbonates or bicarbonates is used, the mixture comprises sodium carbonate or bicarbonate with a second alkali metal carbonate or bicarbonate wherein the alkali metal of the second carbonate or bicarbonate has a higher atomic number than that of sodium. The amount of the second alkali metal carbonate or bicarbonate is such that there is from 0.001 to about 0.20 gram atoms of the second alkali metal per gram atom of sodium.

The higher alkali metal carbonates or bicarbonates are thus selected from the group consisting of potassium, rubidium and cesium carbonates and bicarbonates. Preferred combinations are sodium carbonate or bicarbonate with potassium carbonate or cesium carbonate.

The alkali metal carbonates or bicarbonates should be anhydrous although, if hydrated salts are employed, where the polymerization temperature is relatively low, e.g., 100° to 250° C., the water should be removed, e.g., by heating under reduced pressure, prior to reaching the polymerization temperature.

Where high polymerization temperatures (>250° C.) are used, it is not necessary to dehydrate the carbonate or bicarbonate first, as any water is driven off rapidly before it can adversely affect the course of the polymerization reaction.

The total amount of alkali metal carbonate or bicarbonate employed should be such that there is at least one atom of alkali metal for each phenol group. Hence, when using the monomeric or oligomeric diphenols of the instant invention, there should be at least one mole of carbonate, or two moles of bicarbonate, per mole of the aromatic diol.

An excess of carbonate or bicarbonate may be employed. Hence, there may be 1 to 1.2 atoms of alkali metal per phenol group. While the use of an excess of carbonate or bicarbonate may give rise to faster reactions, there is the attendant risk of cleavage of the resulting polymer, particularly when using high temperatures and/or the more active carbonates.

As stated above, the amount of the second (higher) alkali metal carbonate or bicarbonate employed is such that there are 0.001 to about 0.2 gram atoms of the alkali metal of higher atomic number per gram atom of sodium.

Thus, when using a mixture of carbonates, e.g., sodium carbonate and cesium carbonate, there should be 0.1 to about 20 moles of cesium carbonate per 100 moles of sodium carbonate. Likewise, when using a mixture of a bicarbonate and a carbonate, e.g., sodium bicarbonate and potassium carbonate, there should be 0.05 to 10 moles of potassium carbonate per 100 moles of sodium bicarbonate.

A mixed carbonate, for example sodium and potassium carbonate, may be employed as the second alkali metal carbonate. In this case, where one of the alkali metal atoms of the mixed carbonate is sodium, the amount of sodium in the mixed carbonate should be added to that in the sodium carbonate when determining the amount of mixed carbonate to be employed.

Preferably, from 0.005 to 0.1 gram atoms of the alkali metal of the second alkali metal carbonate or bicarbonate per gram atom of sodium is used.

Where the oligomeric bisphenol of the oligomeric dihalobenzenoid compound are employed, they should be used in substantially equimolar amounts with respect to the monomeric chain-extending reagent. Excesses lead to the production of lower molecular weight products. However, a slight excess, up to 5 mole percent of any of the reagents may be employed, if desired.

The reaction is carried out in the presence of an inert solvent.

Preferably the solvent employed is an aliphatic or aromatic sulfoxide or sulfone of the formula:

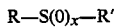

where x is 1 or 2 and R and R' are alkyl or aryl groups and may be the same or different. R and R' may together form a divalent radical. Preferred solvents include dimehtyl sulfoxide, dimethyl sulfone, sulfolane (1,1, dioxothiolan), or aromatic sulfones of the formula:

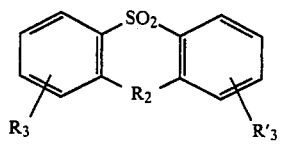

where $R_2$ is a direct link, an oxygen atom or two hydrogen atoms (one attached to each benzene ring) and $R_3$ and $R'_3$, which may be the same or different, are hydrogen atoms and alkyl or phenyl groups. Examples of such aromatic sulfones include diphenylsulfone, dibenzothiophen dioxide, phenoxathiin dioxide and 4-phenylsulfonyl biphenyl. Diphenylsulfone is the preferred solvent. Other solvents that may be used include N,N-dimethyl acetamide, N,N-dimethyl formamide, N-cyclohexyl2-pyrrolidone, and N-methyl-2-pyrrolidone.

The polymerziation temperature is in the range of from about 100° to about 400° C. and will depend on the nature of the reactants and the solvent employed. The preferred temperature is above 270° C. The reactions are generally performed under atmospheric pressure. However, higher or lower pressures may be used.

For the production of some polymers, it may be desirable to commence polymerization at one temperature, e.g., between 200° and 250° C. and to increase the temperature as polymerization ensues. This is particularly necessary when making polymers having only a low solubility in the solvent. Thus, it is desirable to increase the temperature progressively to maintain the polymer in solution as its molecular weight increases.

To minimize cleavage reactions, it is preferred that the maximum polymerization temperature be below 350° C.

The polymerization reaction may be terminated by mixing a suitable and end capping reagent, e.g., a mono or polyfunctional halide such as methyl chloride, t-butyl chloride or 4,4'-dichlorodiphenylsulphone with the reaction mixture at the polymerization temperature, heating a period of up to one hour at a polymerization temperature and then discontinuing the polymerization.

This invention is also directed to an improved process for making the chain-extended polymers in comparatively shorter reaction times overall than by using potassium fluoride alone or by using a combination of sodium carbonate or bicarbonate and a second higher alkali metal carbonate or bicarbonate.

Specifically, this process is directed to preparing the poly(aryl ether ketone) precursors and the chain-extended polymers by the reaction of a mixture of 4,4'-dihydroxybenzophenone and 4,4'-difluorobenzophenone (to make the precursor), or the reaction of the precursor to make the chain-extended polymer, either one or both in the presence of a combination of sodium carbonate and/or bicarbonate and an alkali metal halide selected from potassium, rubidium, or cesium fluoride or chloride or combinations thereof.

The reaction is carried out by heating a mixture of the monomeric reactants or mixtures of the precursors with the appropriate monomeric reactants at a temperature of from about 100° to about 400° C. The reaction is conducted in the presence of added sodium carbonate and/or bicarbonate and potassium, rubidium or cesium fluorides or chlorides. The sodium carbonate or bicarbonate and the chloride and fluoride salts should be anhydrous although, if hydrated salts are employed, where the reaction temperature is relatively low, e.g., 100° to 250° C., the water should be removed, e.g., by heating under reduced pressure, prior to reaching the reaction temperature.

Where high reaction temperatures (>250° C.) are used, it is not necessary to dehydrate the carbonate or bicarbonate and the chloride or fluoride salts first as any water is driven off rapidly before it can adversely affect the course of the reaction. Optionally, an entraining organic medium can be used to remove water from the reaction, such as toluene, xylene, chlorobenzene, and the like.

The total amount of sodium carbonate or bicarbonate and potassium, rubidium or cesium fluoride or chloride, or combinations thereof employed, should be such that there is at least one atom of total alkali metal for each phenol group, regardless of the anion (carbonate, bicarbonate or halide).

Preferably, from about 1 to 1.2 atoms of sodium fo reach phenol group is used. In another preferred embodiment, from 0.001 to about 0.5 atoms of alkali metal (derived from a higher alakli metal halide) is used for each phenol group.

The sodium carbonate or bicarbonate and potassium fluoride are used such that the ratio of potassium to sodium therein is from about 0.001 to about 0.5, preferable from about 0.01 to about 0.25, and most preferably from about 0.02 to about 0.20.

An excess of total alkali metal may be employed. Hence, there may be about 1 to about 1.7 atoms of alkali metal per phenol group. While the use of a large excess of alkali metal may give rise to faster reactions, there is the attendant risk of cleavage of the resulting polymer, particularly when using high temperatures and/or the more active alkali metal salts. Of course, it is well known to those skilled in the art that cesium is a more active metal and potassium is a less active metal so that less cesium and more potassium are used. Further, the chloride salts are less active than the fluoride salts so that more chloride and less fluoride is used.

In the chain-extension process the bisphenol and the dihalobenzenoid or dinitrobenzenoid compound, one of which is oligomeric, are employed in substantially equimolar amounts when maxium molecular weights are desired. An excess of one over the other leads to the production of low molecular weight products. However, a slight excess, up to 5 mole percent, of any of the reactants may still be employed, if desired.

The reactions are carried out in the presence of an inert solvent.

Preferably the solvent employed is an aliphatic or aromatic sulphoxide or sulphone of the formula:

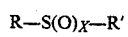

where x is 1 or 2 and R and R' are alkyl or aryl groups and may be the same or different. R and R' may together form a divalent radical. Preferred solvents include dimethyl sulfoxide, dimethyl sulfone, sulfolane (1,1 dioxothiolan), or aromatic sulfones of the formula:

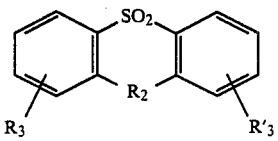

where $R_2$ is a direct link, an oxygen atom or two hydrogen atoms (one attached to each benzene ring) and $R_3$ and $R'_3$, which may be the same or different, are hydrogen atoms and alkyl or phenyl groups. Examples of such aromatic sulfones include diphenylsulfone, dibenzothiophen dioxide, phenoxathiin dioxide and 4-phenylfulfonyl bihenyl. Diphenylsulfone is the preferred solvent. Other solvents that may be used include N,N-dimethyl acetamide, N,N-dimethyl formamide, N-cyclohexyl-2-pyrrolidone and N-methyl-2-pyrrolidone.

The polymerization temperature is in the range of from about 100° to about 400° C. and will depend on the nature of the reactants and the solvent employed. The preferred temperature is above 270° C. The reactions are generally performed under atmospheric pressure. However, higher or lower pressures may be used. The reaction is generally carried out in an inert atmosphere.

For the production of some chain-extended polymers, it may be desirable to commence reaction at one temperature, e.g., between 200° and 250° C. and to increase the temperature as reaction ensues. This is particularly necessary when making high molecular weight polymers having only a low solubility in the solvent. Thus, there it is desirable to increase the temperature progressively to maintain the polymer in solution as its molecular weight increases.

This invention is also directed to an improved process for making the extended polymers gel-free and at very high reaction rates. These polymerizations are performed in the presence of a base which is composed of sodium carbonate or bicarbonate and of a potassium, rubidium, or cesium salt of an organic acid.

Salts of any organic acid are useful. Thus, one may use the potassium, rubidium, or cesium salts of aliphatic linear or branched acids such as formic, acetic, propionic, butyric, isobutyric, pentanoic, hexanoic, heptanoic, octanoic, nonanoic, decanoic, 2-methyl-butyric, 3,4-dimethyl-pentanoic, 4,4-dimethyl hexanoic, 2-ethyl-heptanoic, 3-propyl-5,6,-dimethyl nonanoic and other similar acids.

Salts of halo-substituted aliphatic acids such as
monochloro-, dichloro- and trichloroacetic,
2-chloropropionic,
3,5-dichloroheptanoic,
bromacetic,
3-fluorobutyric and
3,3,3-trichloropropionic acids.

Salts of aromatic mono- or polynuclear acids such as
benzoic, toluic,
3,4-dimethylbenzoic,
2-chlorobenzoic,
3,4-dichlorobenzoic,
2-bromobenzoic,
2-chloro-4-methylbenzoic,
2-fluoro-3-ethylbenzoic;
other alkyl and/or halo-substituted benzoic acids, the naphthalene carboxylic acids, alkyl-substituted naphthalene carboxylic acids such as
3-methyl-naphthalene-1-carboxylic acid,
6-ethyl-naphthalene-2-carboxylic acid;
halo-substituted naphthalene carboxylic acids such as 4-chloro-naphthalene-2-carboxylic acid, phenanthrene and anthracene carboxylic acids and the like.

Salts of aralipatic acids such as
phenylacetic, diphenyl acetic,
1-naphthyl acetic,
2-naphthyl-acetic,
4-chlorophenyl acetic,
4-methylphenyl acetic,
3-bromo-1-naphthyl acetic,
4-chloro-2-naphthyl acetic,
3-(6-chloro-1-naphthyl)propionic,
3-(4-ethylphenyl)butyric,
3-methyl-4-(2-ethyl-4-chlorophenyl)butyric,
3-phenyl-hexanoic, and
7-phenylnonanoic acids.

Salts of heterocyclic carboxylic acids such as
furane-2-carboxylic,
furane-3-carboxylic,
thiophene-2-carboxylic,
thiophene-3-carboxylic,
the pyridine, quinoline and isoquinoline carboxylic acids.

Salts of alkyl, aryl, and halo-substituted heterocyclic acids such as
2-methylfurane-3-carboxylic,
4-chloro-pyridine-2-carboxylic,
2-methyl-4-oxazole carboxylic, and
2-propyl-pyrazine-3-carboxylic acids.

Salts of dicarboxylic acids such as
oxalic, malonic, succinic, adipic, suberic, azelaic,
$\alpha$-bromo-glutaric, $\beta, \beta'$-dimethyl-glutaric,
$\alpha, \alpha'$-dichlorosuberic,
maleic and fumaric acids.

Salts of aromatic and heterocyclic dicarboxylic acids such as
phthalic, isophthalic, terephthalic,
naphthalene-1,2-dicarboxylic,
naphthalene-2,3-dicarboxylic,
naphthalene-1,5; 1,6; 1,7; 1,8; 2,4; 2,5; and 2,6-dicarboxylic,
pyridine-2,3-dicarboxylic,
furane-2,3-dicarboxylic acids and the like.

Salts of aliphatic, aromatic, and heterocyclic sulfonic and sulfinic acids such as
methane sulfonic, ethane sulfonic,
propane sulfonic, benzene sulfonic,
benzene sulfinic, 1-naphthalene sulfonic,
2-naphthalene sulfonic, 1-naphthalene sulfinic,
1,8-naphthalene disulfonic,
2,6-naphthalene disulfonic,
4-methyl-benzene sulfinic,
p-toluene sulfonic,
3,4-dichloro-benzene sulfonic,
6-chloro-naphthalene-1-sulfonic,
quinoline-2-sulfonic,
4-pyridine sulfonic,
2-thiophene sulfonic,
3-thiophene sulfonic,
3-methyl-2-furane sulfinic,
3-propyl-2-furane-sulfonic acids and the like.

Salts of aliphatic, aromatic, and heterocyclic phosphonic and phosphinic acids such as
methane phosphonic, ethane phosphonic,
benzene phosphinic, benzene phosphonic,
1-naphthalene phosphonic,
2-naphthalene phosphonic,
1-naphthalene phosphinic, 1,8-naphthalene diphosphonic,
2,6-naphthalene diphosphonic,
4-methyl-benzene phosphinic,
4-ethyl-benzene phosphonic,
3,4-dichloro-benzene phosphonic,
3,4-dibromobenzene phosphonic,
3-chloro-4-methyl benzene phosphonic,
6-chloro-1-naphthalene phosphonic,
2-quinoline-phosphonic,
2-thiophene phosphonic,
3-thiophene phosphonic,
3-thiophene phosphonic,
3-thiophene phosphinic,
3-chloro-2-furane phosphinic,
3-propyl-2-furane phosphonic acids and the like.

Mixed salts such as for example, mixtures of potassium and rubidium acetates or mixtures of potassium acetate and potassium benzene sulfonate, and the like can also be used. The preferred salts are potassium formate, acetate, propionate, oxalate, benzoate, benzene sulfonate and p-toluene sulfonate.

The reaction is carried out by heating a mixture of the above indicated monomers or precursors at a temperature of from about 100° to about 400° C. The reaction is conducted in the presense of added sodium carbonate and/or bicarbonate and potassium, rubidium or cesium salts of an organic acid, vide ultra. The sodium carbonate or bicarbonate and the organic salts should be anhydrous, although, if hydrated salts are employed where the reaction temperature is relatively low, e.g., 100° to 250° C., the water should be removed, e.g., by heating under reduced pressure, prior to reaching the reaction temperature.

Where high reaction temperatures (>250°) are used, it is not necessary to dehydrate the carbonate, bicarbonate, or the organic acid salt first, as any water is driven off rapidly before it can adversely affect the course of the reaction. Optionally, an entraining organic medium can be used to remove water from the reaction mixture such as toluene, xylene, chlorobenzene, and the like.

The total amount of sodium carbonate and/or bicarbonate and potassium, rubidium or cesium organic salt employed should be such that there is at least one atom of total alkali metal for each phenol group, regardless of the anion (carbonate, bicarbonate and of the organic acid).

Preferably, from about 1 to about 1.2 atoms of sodium for each phenol group is used. In another preferred embodiment, from 0.001 to about 0.5 atoms of alkali metal (derived from the alkali metal organic salt) is used for each phenol group.

The sodium carbonate or bicarbonate and the potassium organic salt are used that the ratio of potassium to sodium therein is from about 0.001 to about 0.5, preferably from about 0.001 to about 0.20, and most preferably from about 0.01 to about 0.1.

An excess of total alkali metal may be employed. Hence, there may be about 1 to about 1.7 atoms of alkali metal per phenol group. While the use of a large excess of alkali metal may give rise to faster reactions, there is the attendant risk of cleavage of the resulting polymer, particularly when using high temperatures and/or the more acive alkali metal salts. Of course it is well known to those skilled in the art that cesium is a more active metal and potassium is a less active metal so that less cesium and more potassium are used. It is preferred that the ratio of carbonate and bicarbonate anions to the phenolic groups be about 0.5 to 1.0, respectively. However, higher and lower ratios are also possible.

In the chain-extension process, the bisphenol and the dihalobenzenoid or dinitrobenzenoid compound, one of which is oligomeric, are employed in substantially equimolar amounts when maximum molecular weights are desired. An excess of one over the load leads to the production of low molecular weight products. However, a slight excess, up to 5 mole percent of any of the reactants may still be employed, if desired.

The reaction is carried out in the presence of an inert solvent.

The solvent employed is an aliphatic or aromatic sulphoxide or sulphone of the formula $$R-S(O)_x-R'$$

where x is 1 or 2 and R and R' are alkyl or aryl groups and may be the same or different. R and R' may together form a divalent radical. Preferred solvents include dimethyl sulphoxide, dimethyl sulphone, sulpholane (1,1-dioxothiolan), or aromatic sulphones of the formula

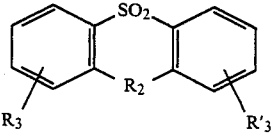

where $R_2$ is a direct link, an oxygen atom or two hydrogen atoms (one attached to each benzene ring) and $R_3$ and $R'_3$, which may be the same or different, are hydrogen atoms or phenyl groups. Examples of such aromatic sulfones include diphenylsulfone, ditolyl sulphone, tolylphenyl sulphone, dibenzothiophene dioxide, phenoxathiin dioxide and 4-phenylsulfonyl biphenyl. Diphenylsulfone is the preferred solvent. Other solvents that may be used include N,N-dimethyl formamide, N-methyl-2-pyrrolidone, N,N-dimethylacetamide, and N-cyclohexyl pyrrolidone. The reaction temperature is in the range of from about 100° to about 400° C. and will depend on the nature of the reactants and the solvent. The preferred temperature is above 250° C. The reactions are preferably carried out at ambient pressure. However, higher or lower pressure can also be used. The reaction is generally carried out in an inert atmosphere.

For the production of some chain-extended poly(aryl ether ketones) of the instant invention, it may be desirable to commence reaction at one temperature, e.g., between 200° and 250° C. and to increase the temperature as reaction ensures. This is particularly necessary when making high molecular weight polymers having only a low solubility in the solvent. Thus, there it is desirable to increase the temperature progressively to maintain the polymer in solution as its molecular weight increases.

The copolymers of this invention may include mineral fillers such as carbonates including chalk, calcite and dolomite; silicates including mica, talc, wollastonite, silicone dioxide, glass spheres, glass powders, aluminum, clay, quartz, and the like. Also, reinforcing fibers such as fiberglass, carbon fibers, and the like may be used. The copolymers may also include additives such as titanium dioxide, thermal stabilizers, ultraviolet light stabilizers, plasticizers, and the like.

The copolymers of this invention may be fabricated into any desired shape, i.e., moldings, coatings, films, or fibers. They are particularly desirable for use as electrical insulation for electrical conductors.

Also, the copolymers may be woven into monofilament threads which are then formed into industrial fabrics by methods well known in the art as exemplified by U.S. Pat. No. 4,359,501. Further, the copolymers may be used to mold gears, bearings and the like.

EXAMPLES

The following examples serve to give specific illustrations of the practice of this invention but they are not intended in any way to limit the scope of this invention.

EXAMPLE 1

A one-liter, 4-necked flask was fitted with a mechanical stirrer, reflux condenser, thermometer, nitrogen inlet and gas outlet attached to a sodium scrubber. The apparatus was purged with nitrogen and while under a positive pressure was charged with 550 ml of methylene chloride,
79.28 g of p-fluorobenzoyl chloride (0.50 moles), and
42.55 g of diphenyl ether (0.25 moles).

After the contents of the flask were cooled to 0° C., 76.67 g of aluminum trichloride (0.575 moles) were added at a rate such that the temperature should not exceed 5° C. The dark red homogeneous reaction mixture was stirred at 0°–5° C. for 6 hours, and then allowed to warm to room temperature; stirring was continued for an additional 16 hours. The mixture was then quenched into a solution of 1500 ml of water and 100 ml of concentrated hydrochloric acid; it was refluxed with continuous removal of the methylene chloride for approximately two hours and filtered. The final product having the general structure (2b) in which x=1 and melting at 215–215.5° C. was obtained after recrystallization from monochlorobenzene.

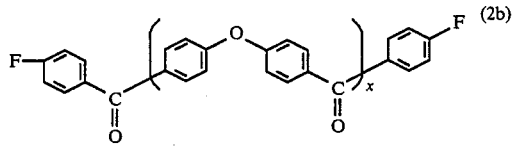

EXAMPLE 2

The apparatus described in Example 1 was charged with 660 ml of 1,2-dichloroethane,
174.42 g of p-fluorobenzoyl chloride (1.10 moles),
85.10 g of diphenyl ether (0.50 moles).

After the contents of the flask were cooled to 0° C., 168.68 g of aluminum trichloride (1.265 moles)s were added at a rate such that the temperature of the mixture should not exceed 5° C. The dark red homogeneous reaction mixture was stirred at 0-5° C. for 6 hours, and then allowed to warm to room temperature; stirring was continued for an additional 16 hours. The mixture was then quenched into a solution of 3000 ml of water and 200 ml of concentrated hydrochloric acid, refluxed with continuous removal of the 1,2-dichloroethane for approximately two hours and filtered. The final product having the general structure (2b) in which x=1 and melting at 215°-215.5° C. was obtained after recrystallization from omnochlorobenzene in an 80 percent yield.

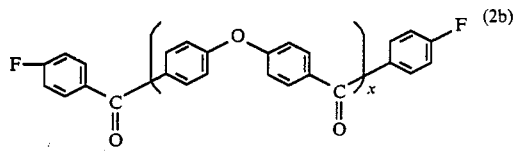

EXAMPLE 3

A 500 ml, 4-necked flask was fitted with a mechanical stirrer, Dean-Stark trap, reflux condenser, nitrogen sparge tube, and a thermocouple. The apparatus was purged with nitrogen and while under a positive pressure was charged with 37.64 g of phenol (0.40 moles),
34.55 g of potassium carbonate (0.25 moles),
43.64 g of 4,4'-difluorobenzophenone (0.20 moles),
75 ml of toluene, and
250 ml of dimethyl acetamide.

The contents were heated; at about 155° C., toluene began to distill. After about 5 hours, the toluene was completely removed; the temperature of the reaction mixture was about 165° C. at that point in time. The reaction mixture was allowed to cool, poured into a solution of three liters of water and 25 ml of concentrated hydrochloric acid, stirred for 16 hours and filtered. The final product having the general structure (2a) in which x=1 melted at 143°-145° C. after crystallization from toluene; its yield was 80 percent.

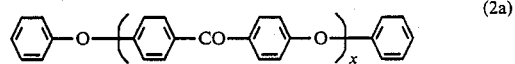

EXAMPLE 4

Using the general technique of Example 3, the following are prepared.

Reaction Scheme

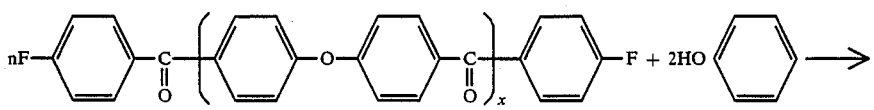

-continued
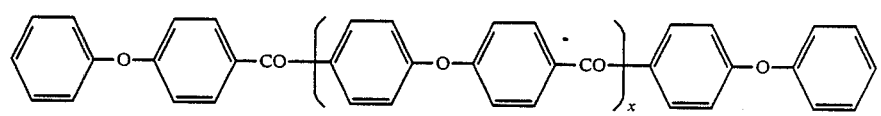
(2a)
The new oligomers are listed in Table I.

TABLE I
Oligomers of the General Formula (2a)
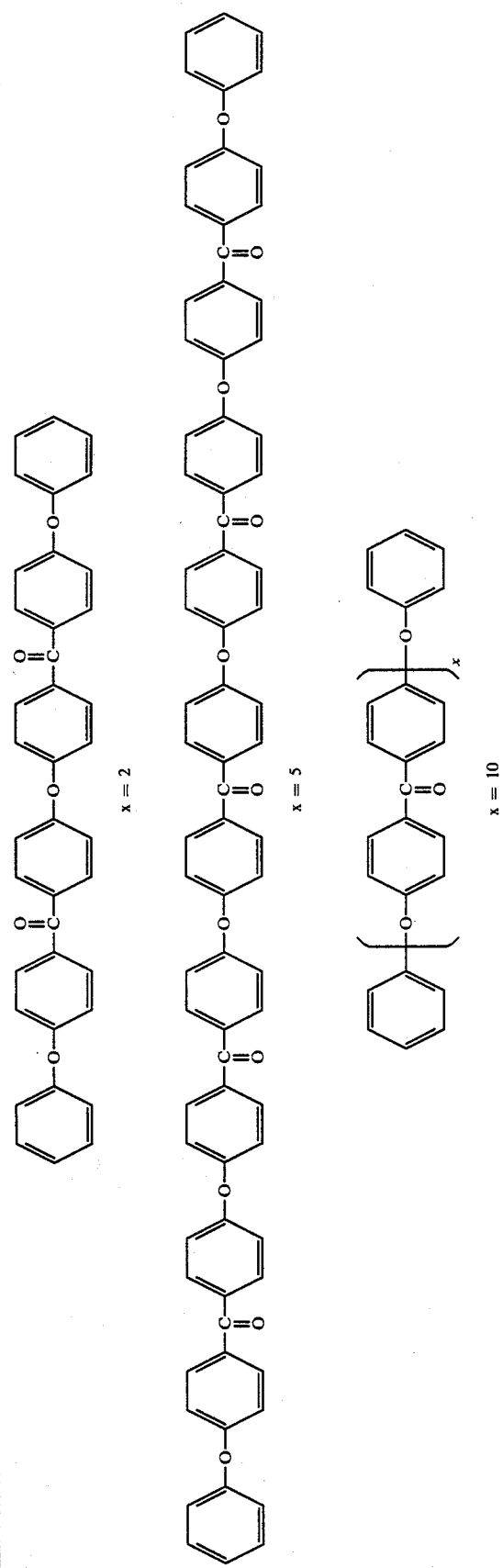

EXAMPLE 5

A one-liter, 4-necked flask was fitted with a mechanical stirrer, reflux condenser, thermometer, nitrogen gas inlet and gas outlet connected to a sodium hydroxide scrubber. The apparatus was purged with nitrogen and while under a positive pressure was charged with

- 45.80 g of 4,4'-diphenoxylbenzophenone (0.125 moles),
- 43.60 g of p-fluorobenzoyl chloride (0.275 moles),
- 547 ml of 1,2-dichloroethane.

After the contents of the flask were cooled to 0° C., 69.34 g of aluminum trichloride (0.52 moles) were added at a rate such as not to exceed 5° C. The dark red homogeneous reaction mixture was stirred at 0°-5° C. for 6 hours, allowed to warm to room temperature and left stirring for an additional 16 hours. The entire mixture was then quenched into a solution of 3000 ml of water and 100 ml of concentrated hydrochloric acid, refluxed with continuous removal of the 1,2-dichloroethane for two hours and filtered. The final product having the general structure (2b) in which x=2 and melting at 280°-285° C. was obtained by recrystallization from N,N-dimethyl acetamide in an 85 percent yield.

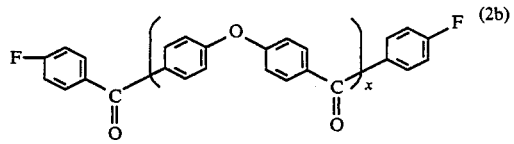
(2b)

EXAMPLE 6

Using the general technique of Examples 1, 2 and 5, the following are prepared via the reaction scheme below:

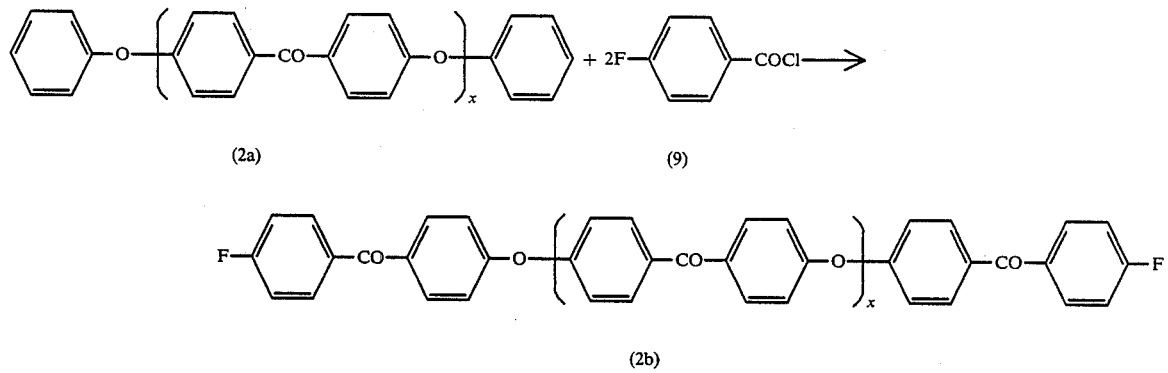

The new oligomers are listed in Table II.

TABLE II
Oligomers of the General Formula (2b)

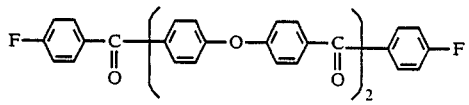

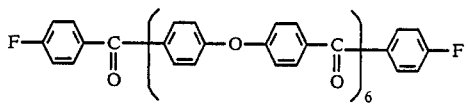

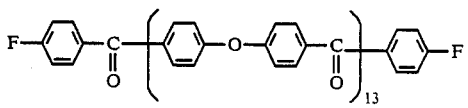

EXAMPLE 7

A 500 ml, 5-necked flask was fitted with a septum, gas inlet, mechanical stirrer, thermometer, dry ice condenser, and gas outlet connected to a sodium hydroxide scrubber. The apparatus was charged with

- 47.88 g of aluminum trichloride (0.359 moles),
- 7.61 g of lithium chloride (0.180 moles), and
- 125 ml of 1,2-dichloroethane.

The mixture was cooled to −30° C. followed by the sequential addition of 15.29 g of diphenyl ether (0.090 moles) and 0.71 g of p-fluorobenzoyl chloride (0.005 moles) via syringe. 17.76 g of phosgene (0.180 moles) were then distilled into the reaction mixture. After completion of the addition, the mixture was allowed to warm up to room temperature, stirred for an additional 75 hours, and was then terminated by adding 300 ml of chilled methanol. The suspension was transferred to a blender containing 500 ml of methanol, agitated for ten minutes, filtered, washed with 200 ml of methanol, and dried for approximately 17 hours in a vacuum oven at about 140° C. The final product obtained was of the general structure (2c); it had a reduced viscosity of 0.58 dl/g (1 percent solution in concentrated $H_2SO_4$ at 25° C.).

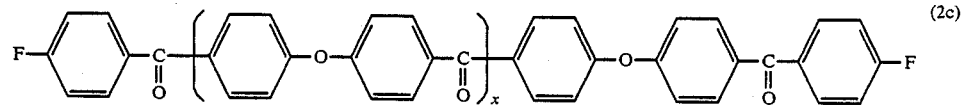
(2c)

EXAMPLE 8

A 500 ml, 5-necked flask was fitted with a septum, gas inlet, mechanical stirrer, thermometer, dry ice condenser, and gas outlet connected to a sodium hydroxide scrubber. The apparatus was charged with
- 52.41 g of aluminum trichloride (0.393 moles),
- 8.33 g of lithium chloride (0.197 moles), and
- 137 ml of 1,2-dichloroethane.

The mixture was cooled to $-30°$ C. followed by the sequential addition of 16.58 g of diphenyl ether (0.097 moles) and 0.170 g of p-fluorobenzoyl chloride (0.001 moles), via syringe. 19.44 g of phosgene (0.197 moles) was then distilled into the reaction mixture. After completion of the addition, the mixture was allowed to warm up to room temperature and stirred for an additional 72 hours; it was then terminated by adding 400 ml of chilled methanol. The suspension was transferred to a blender containing 500 ml of methanol, agitated for 20 minutes, filtered, washed with 500 ml of methanol, and dried for approximately 17 hours in a vacuum oven at about 140° C. The product obtained was of the general structure (2c). It had a reduced viscosity of 1.92 dl/g (one percent solution in concentrated $H_2SO_4$ at 25° C.).

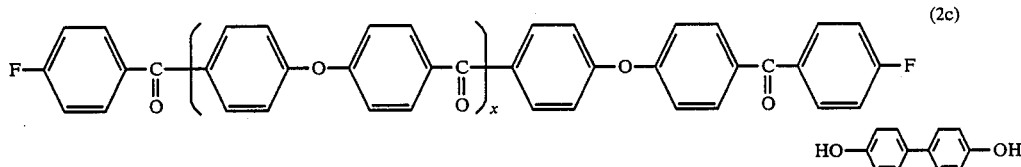

EXAMPLE 9

A 250 ml flask was equipped with a mechanical stirrer, nitrogen sparge tube, thermocouple, Dean Stark trap, condenser and a pressure equalizing dropping funnel. To the reactor were added
- 9.5 g of a difluoro end capped crystalline poly(aryl ether ketone) having the general structural formula (2c) in which x=11,
- 0.407 g (0.0037 moles) of hydroquinone;
- 0.392 g (0.0037 moles) of sodium carbonate;
- 0.011 g (0.0001 moles) of potassium acetate;
- 40 g of diphenyl sulfone and
- 10 ml of xylene.

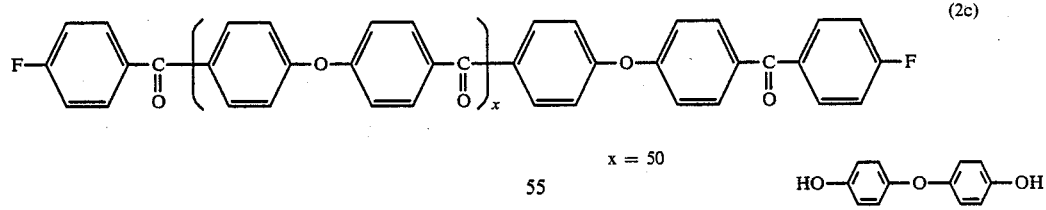

The apparatus was evacuated and purged with nitrogen. This procedure was repeated three times. Nitrogen circulation was maintained while the mixture was heated to 200° C. for 30 minutes followed by 30 minutes at 250° C. During this time, the xylene was continuously replenished. The temperature was then increased to 320° C. and kept at this level for 90 minutes. A brown reaction mixture was obtained. It was poured hot from the reactor, allowed to solidify and then ground finely. The resultant material was refluxed in acetone (2×350 ml); water (2×350 ml); and acetone (1×350 ml) to afford a brown polymeric material.

EXAMPLE 10

Using the general technique of Example 9, the following polymers are prepared via the scheme:

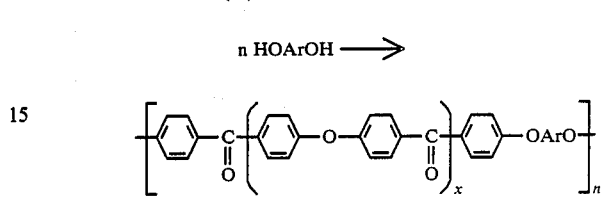

n HOArOH ⟶

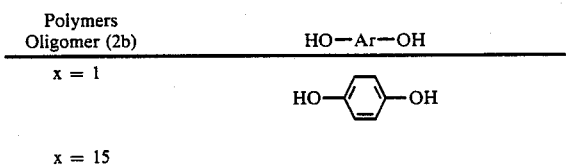

| Polymers Oligomer (2b) | HO—Ar—OH |
|---|---|
| x = 1 | HO—⌬—OH |
| x = 15 | HO—⌬—⌬—OH |
| x = 3 | HO—⌬—CO—⌬—OH |
| x = 7 | HO—⌬—CO—⌬—CO—⌬—OH |
| x = 20 | HO—⌬—C(CH₃)₂—⌬—OH |
| x = 50 | HO—⌬—O—⌬—OH |

What is claimed is:

1. A tough, linear chain-extended poly(aryl ether ketone) polymer of the formula

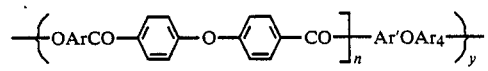

wherein Ar, Ar' and Ar₄ are divalent aromatic radicals, n is at least three, and y is one or greater; with the proviso that Ar₄ cannot be the residue of 4,4'-dihydroxybenzophenone.

2. The chain-extended poly(aryl ether ketone) of claim 1 wherein Ar₄ is selected from the following:

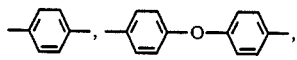, 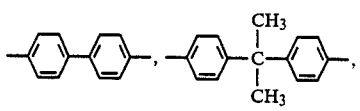

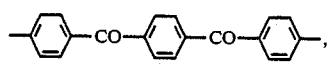

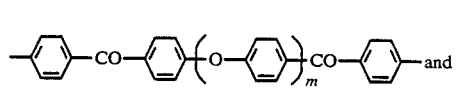

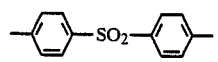

where m is an integer of from 1 to 5.

3. The chain-extended poly(aryl ether ketone) of claims 1 or 2 wherein Ar' is selected from the following:

-continued

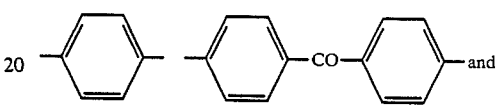

or isomers thereof

or isomers thereof

4. The chain-extended poly(aryl ether ketone) of claims 1 wherein Ar is selected from the following:

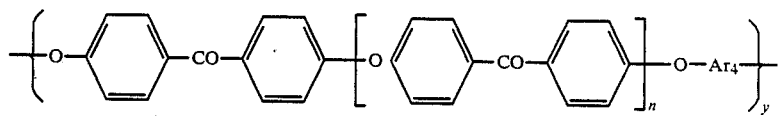

5. The chain-extended (poly(aryl ether ketone) of claim 1 having the formula

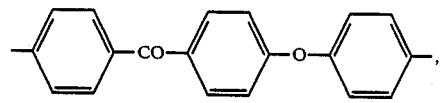

wherein n is three or greater, Y is one or greater, and Ar₄ is selected from the following:

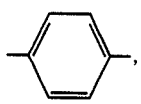,

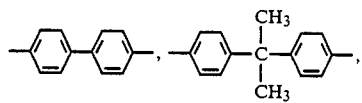,

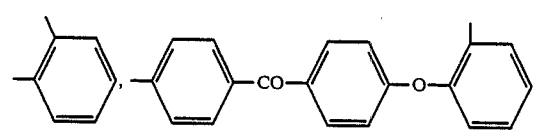,

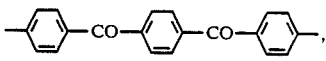,

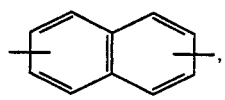,

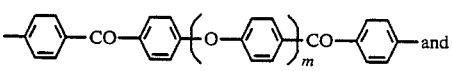,

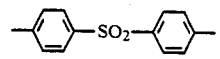

or isomers thereof where m is an integer of from 1 to 5.

* * * * *

UNITED STATES PATENT AND TRADEMARK OFFICE
CERTIFICATE OF CORRECTION

PATENT NO. : 4,820,790
DATED : April 11, 1989
INVENTOR(S) : Winslow-Matzner

It is certified that error appears in the above-identified patent and that said Letters Patent is hereby corrected as shown below:

Column   Line
32       64    " 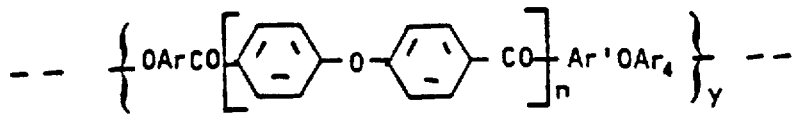 "  should read

-- $\{OArCO[\langle\_\rangle-O-\langle\_\rangle-CO]_n Ar'OAr_4\}_y$ --

Signed and Sealed this

Third Day of October, 1989

*Attest:*

DONALD J. QUIGG

*Attesting Officer*      Commissioner of Patents and Trademarks